March 1, 1927. 1,619,234
L. W. BEEBE
LIQUID CONTROL SYSTEM
Filed Oct. 15, 1925  2 Sheets-Sheet 1
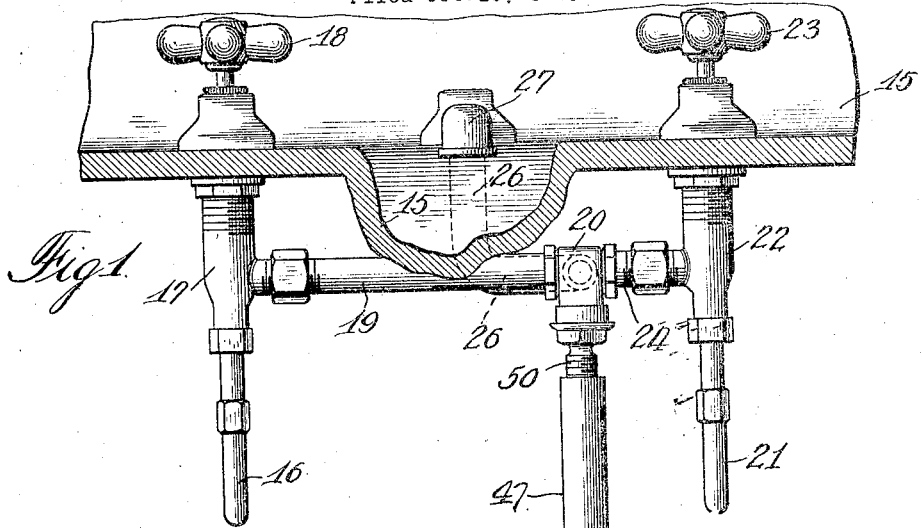
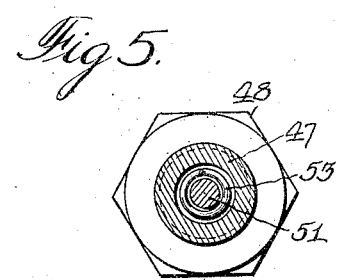
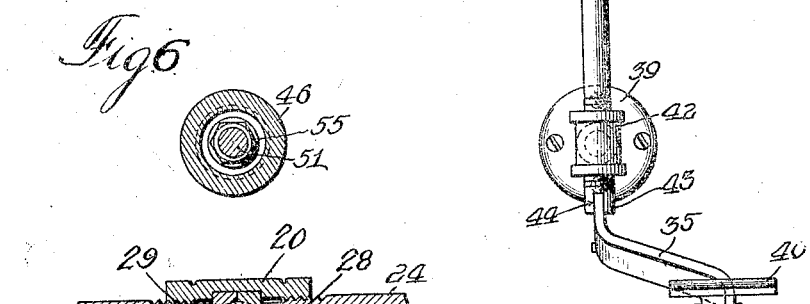
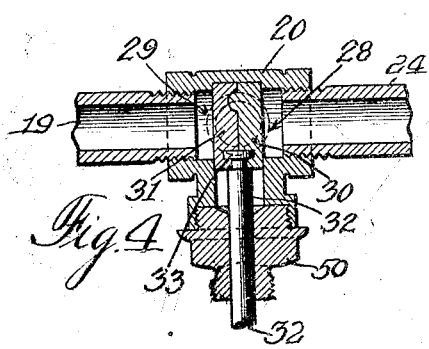
Inventor
Leslie W. Beebe
By Luther Johns, Atty March 1, 1927.
L. W. BEEBE
1,619,234
LIQUID CONTROL SYSTEM
Filed Oct. 15, 1925  2 Sheets-Sheet 2
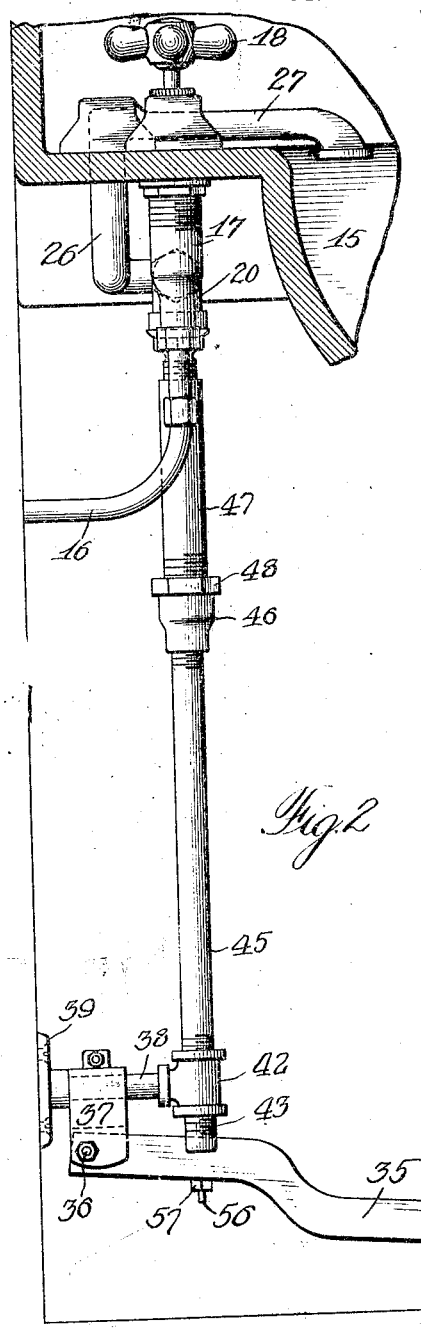
Fig.2
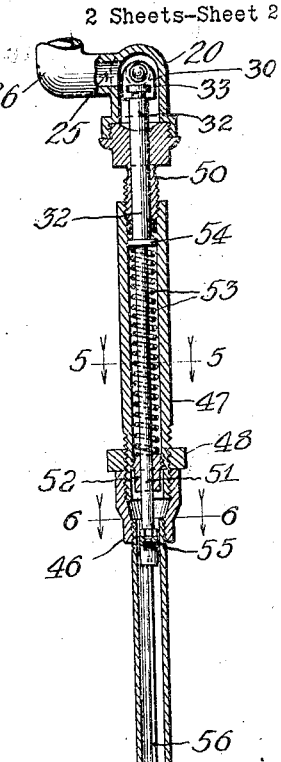
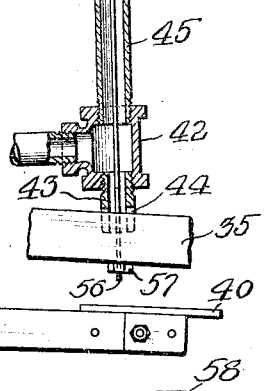
Fig.3
Inventor
Leslie W. Beebe
By Luther Johns Atty.

Patented Mar. 1, 1927.

1,619,234

UNITED STATES PATENT OFFICE.

LESLIE W. BEEBE, OF OAK PARK, ILLINOIS.

LIQUID-CONTROL SYSTEM.

Application filed October 15, 1925. Serial No. 62,535.

These improvements relate to systems or means for controlling the flow of liquids which it is desired to mix for use.

The principal objects are to provide a system or means for the control of liquids whereby a plurality of liquids of different properties, and which may be under different pressures, may be mixed and discharged for use in predetermined proportions and thereafter drawn off from time to time without varying the proportions of the mixture; and, in one important aspect of the improvements, without manual manipulation of any control valve after the discharge of the desired amount; a system also whereby either of the liquids may be drawn off independently of the other, and, if so desired, also without manual manipulation of the discharge valve; and one whereby, also, when the liquids are of different pressures and the valves controlling the amount of liquid flowing to the mixing chamber are open, the liquid under greater pressure in one supply pipe will not force back or in reverse direction the liquid under lesser pressure in another supply pipe; and an important object is to accomplish the advantages and results herein pointed out by means which are notably simple, of few parts, which may be relatively cheap in manufacture and installation, which are not likely to get out of order, and which in use provide peculiar features of safety, and the saving of time and effort as well as liquid, and afford notable convenience in use.

Various advantages will appear in describing the use of these improvements in such places as hospitals, etc., where sanitary conditions are of vital importance. In the hospital the the surgeon and his attendants are constantly requiring warm water, not too hot, for cleaning their hands or appliances, but for such purposes they do not desire to use a body of water in a bowl, for the bowl is never sterile and may be highly septic. The safest and only approved method is to wash in a stream of water issuing from the discharge nozzle at the bowl. In this connection the present improvements have consideration of the fact that the vitally important thing in such instances is to maintain an uncontaminated condition of the operator's hands after they have been washed, so that if some preliminary manual operation of valves should be called for, as, for instance, to obtain the desired temperature of the mixture, followed by the cleansing of the hands in the runnning water, the desired result of safety will be had if the operator may then close the discharge valve and leave the device without again touching anything with his hands.

Ordinarily, according to these improvements, the operator will not have to touch any valve or other object, for the arrangement of parts is such that the hand valves which control the hot and cold water supplies will remain in a given and proper adjustment from one user to the next.

I am aware that various water-control devices have heretofore been suggested for use in hospitals and the like and which were designed to avoid the touching of any valve by the hands at any time, such constructions being relatively expensive, inconvenient in use, complicated, and in most cases incapable of controlling the volume of mixture at the temperature desired. By recognizing, as I have done, that it is only after the cleansing operation that care must be exercised against contamination, I have been able to provide an unusually simple control system having many advantages over all others of generally like character thus far coming to my attention.

There are various applications of the device in which the necessity for strict attention to sterile conditions is not necessary, and in which the valve for controlling the discharge may be hand-operable, for instance in shower or tub baths, kitchen sinks, etc.

The invention has an important application in such places as hotel bath rooms and public lavatories, where the foot-operable discharge valve is preferred. In such places also the user prefers the running water to a supply in the bowl, and he can obtain this by simply placing one foot on a pedal, and, if necessary, regulating the supply valves to obtain hot or cold water, or a mixture of them. On removing his foot from the pedal the flow stops, and through this safeguard against neglected valves a great saving in water may be effected and such damage to property avoided as is constantly occurring through overflows of the bowl.

An important object and advantage of the invention is to preserve for use the normal character of the liquid in each of the supply pipes, and to this end the improvement includes means for preventing the liquid of one supply pipe, for instance hot water which may be drawn from a boiler under steam pressure, from forcing the other liquid, for instance cold water under a much lower pressure, back and away from the mixing valve, the effect of which would be the presence of hot water in both supply pipes and the issuance of scalding water at the discharge nozzle until the cold water had again come to the mixing valve.

In the drawings Figure 1 is a front view of these improvements as applied to a wash bowl, lavatory, or sink, the bowl element being partially broken away; Fig. 2 is a side view of the structure of Fig. 1; Fig. 3 is a medial vertical section through the discharge valve and its control means; Fig. 4 is a longitudinal vertical section through the discharge valve; and Figs. 5 and 6 are sectional views respectively on the lines 5—5 and 6—6 of Fig. 3.

Referring to Figs. 1, 2 and 3 my improved system is shown in association with a lavatory or sink 15 which may be of any approved form.

Describing the device illustrated with respect to the control of hot and cold water, there is provided a hot water pipe 16, a valve 17 therein operated by the handle 18 for controlling the supply of hot water to the pipe 19 connected with the hollow valve body 20. On the other side there is a cold water pipe 21 connected to the valve 22 having a handle 23 for controlling the supply of cold water to the pipe 24 also connected with the hollow valve body 20. These hand valves 17 and 22 may be of the usual form used in similar situations.

From Fig. 3 it will be noted that the hollow valve body 20 has a discharge port 25 opening into the pipe 26 which is shown by Figs. 1 and 2 to be in communication with the nozzle member or spout 27 arranged to discharge into the bowl.

The sectional view of Fig. 4 shows that the valve body 20 has an inlet port for cold water at 28 and an inlet port for hot water at 29, and that within this body there is a pair of sliding valve members 30 and 31 adapted to fit against the walls, slightly tapering upward, defining the ports 28 and 29. These valve members 30 and 31 are moved up and down by the rod 32 having a head 33 engaging oppositely disposed recesses in the members 30 and 31.

When the rod 32 is drawn downward the hot and cold water ports are opened and the two liquids are mixed in the hollow body 20 and are discharged through the port 25 (Fig. 3) and the nozzle 27. The hand valves 18 and 23 control the relative quantities of hot and cold water used.

From Fig. 2 it will be noted that the foot lever 35 is pivotally mounted at 36 on a bracket 37 clamped to a support 38 in the form of a pipe secured by a flange-like base 39 to the wall of the room or other suitable object, and that the foot lever 35 has a pedal 40, which will ordinarily be at about three inches from the floor whereby the user may stand quite solidly on both feet and still operate the pedal with the toe portion of one foot.

The support 38 is shown as being threaded into a coupling 42 having at its bottom a nipple-like extension 43 provided with a slot at 44 adapted to receive and guide the foot lever 35.

Into the upper end of the coupling 42 is threaded a pipe 45 having at its upper end a flaring coupling 46 into which is threaded a pipe 47, the nut 48 locking these parts in a predetermined vertical adjustment. Such an adjustable feature facilitates the installation of the device when the support members 38 and 39 are not quite accurately placed in vertical directions.

Into the pipe 47 is threaded one end of the valve bonnet 50, the other end thereof being threaded into the housing 20, and through which bonnet the reciprocating stem 32 passes.

Rigidly secured to the stem 32 is a rod 51 passing through the pipe 47. Secured in any approved way, as by threading it into the lower end of the pipe 47, is a tubular stop 52 against which the expansion spring 53 rests, the upper end of the spring pressing against a collar 54 at the lower end of the valve stem 32. The discharge valve is thus normally maintained closed.

To the lower end of the rod 51 is secured, as by a threaded connection 55, a pull rod 56, and this is connected to the foot lever 35 as by a nut 57. Adjustment of the position or throw of the foot lever may be had at this nut 57, and in this connection it is pointed out that the pedal should touch the floor or a rest 58 thereon at about the time the discharge valve is fully opened so as to relieve strain upon the various connections.

While it might be feasible to use some other form of discharge valve providing for a substantially simultaneous opening and closing of the two intake ports and which would prevent the cross-flow of liquids under different pressures when the valve is closed, the particular type of valve herein shown, and which is known in the art as a gate valve, is peculiarly advantageous in such a system since simplicity of construction and operation are of prime importance. In the type shown a direct longitudinal pull opens the valve, and the sliding action of the flat-faced members 30—31 against the annular plane seats defining the intake ports 28 and 29 keeps these facing surfaces clean and in polished and tight-fitting relation to each other, and maintains the desired tight joint throughout a long period of use. Furthermore, the operation of this particular type of valve requires very little effort.

It will thus be clear that, according to these improvements, on pressing down upon the foot pedal the operator may wash in a running stream which will ordinarily be of the right temperature through an established adjustment of the valves 18 and 23, and that the act of removing his foot from the pedal results in closing the discharge valve through the expansion of the spring 53, and that the operator may then leave the device without touching anything with his hands.

It will be clear too that the various other advantages and objects herein pointed out are thus realized in a very simple system and device.

I contemplate as being within these improvements such changes in, modifications of and departures from what I have thus specifically illustrated and described as fall within the scope of the appended claims.

I claim:

1. A unitary organization of passageway-and-valve-means forming a control system for liquids of different properties, and which may be under different pressures, comprising means independent of each other for conducting a plurality of such liquids to and into a hollow valve body to be mixed therein, a hollow valve body in communication with said conducting means respectively, said body having a discharge port for the mixed liquids, valve means independent of each other associated with said conducting means respectively for providing an independent control of each liquid to said body, and valve means in said body for controlling the discharge of mixed liquids from said body and, when said last-mentioned valve means are closed and said first-mentioned valve means are open, for maintaining the liquid in each of said conducting means from being forced in reverse direction by a higher pressure on the liquid in one than in another of said conducting means.

2. In a unitary organization of pipe-and-valve-means forming a liquid control system of the character described, the combination of a hot water pipe, a cold water pipe, a valve body to which said pipes are connected so as to discharge thereinto for mixing the hot and cold water therein, said body having a discharge port for the mixed liquids, a valve associated with each of said pipes for providing an independent control of the flow through each pipe into said body, valve means in said body for controlling the discharge of mixed liquids therefrom and, when said body valve means are closed and said pipe valves are open, for maintaining the liquid in either of said pipes from being forced in reverse direction by a higher pressure on the liquid in one than in the other of said pipes.

3. In a liquid control system of the character described, the combination of a hot water pipe, a cold water pipe, a valve body to which said pipes are connected so as to discharge thereinto for mixing the hot and cold water therein, said body having a discharge port for the mixed liquids, a valve associated with each of said pipes for controlling the flow to said body, valve means in said body for controlling the discharge of mixed liquids therefrom and, when said body valve means are closed and said pipe valves are open, for maintaining the liquid in either of said pipes from being forced in reverse direction by a higher pressure on the liquid in one than in the other of said pipes, and foot-operated means for opening said valve means to discharge liquid from said body.

4. In a unitary liquid control system of the character described, the combination of means forming a mixing chamber having intake ports and a discharge port, independent means including valves independent of each other for conducting to said chamber in independently controllable quantities a plurality of liquids to be mixed therein, and valve means independent of said valves and between said discharge port and said valves respectively for controlling a flow of the respective liquids in the direction toward said discharge port when said valves are open, for providing a flow through the discharge port at will when said valves are open, and for maintaining liquid from flowing in reverse direction toward said valves respectively when said valves are open and said valve means are closed.

5. The combination with a lavatory bowl, sink, or the like, of a hot water pipe and a cold water pipe each having a hand valve therein operable from a place adjacent to the bowl sink or the like, a hollow valve body to which said hot and cold water pipes are connected so as to discharge thereinto, the body having intake ports where said pipes respectively discharge thereinto, said valve body having a discharge opening and discharge pipe means leading therefrom to discharge into said bowl, sink or the like, valve means in said body for substantially simultaneously opening and substantially simultaneously closing said intake ports, means including a pedal adjacent to the floor for operating the valve means in said body to open said intake ports, and spring means for operating said last mentioned valve means to close said intake ports.

6. In a unitary liquid control system of the character described, the combination of independent means for conducting a plurality of liquids of different properties and which may be under different pressures to and into a hollow valve body to be mixed therein, a valve in each of said conducting means for independent control of liquid flow in each thereof, a hollow valve body connected to and in communication with said conducting means respectively, said body having an intake port associated with each of said conducting means, each of said intake ports being defined by a flat valve seat, and reciprocating valve means in said body having a plurality of flat surfaces facing, interfitting with, and being arranged to slide upon, the flat surfaces defining said ports respectively, and to open and close said respective ports, and means for operating said valve means, said hollow body having a discharge port for liquids mixed therein.

7. The combination of claim 6 hereof in which there is a pedal for operating the valve means to open said ports, and spring means for operating the valve means to close said ports.

8. A device for controlling the mixing and discharge of liquids of different properties and which may be under different pressures, comprising in combination a pair of supply-controlling valves each adapted to be connected to a different source of liquid supply, a hollow discharge valve body, means forming an independent passageway from each of said valves to and into said discharge valve body, the discharge valve body having a discharge port for the mixed liquids and having an intake port associated with each of said passageway-forming means, said valve body having valve means operable from outside the body for substantially simultaneously opening and substantially simultaneously closing said intake ports.

9. The combination with a lavatory bowl, sink, or the like, of a hot water pipe and a cold water pipe each having a hand valve therein operable from a place adjacent to the bowl, sink or the like, a hollow valve body to which said hot and cold water pipes are connected so as to discharge thereinto, the body having intake ports where said pipes respectively discharge thereinto, said valve body having a discharge opening and discharge pipe means leading therefrom to discharge into said bowl, sink or the like, valve means in said body for substantially simultaneously opening and substantially simultaneously closing said intake ports, means adjacent to the bowl, sink or the like for operating the valve means in said body to open said intake ports, and spring means for operating said last-mentioned valve means to close said intake ports.

LESLIE W. BEEBE.